United States Patent [19]
O'Neill

[11] Patent Number: 6,040,653
[45] Date of Patent: Mar. 21, 2000

[54] PIEZOELECTRIC POSITIONER

[75] Inventor: Cormac G. O'Neill, Walnut Creek, Calif.

[73] Assignee: Kinetic Ceramics, Inc., Hayward, Calif.

[21] Appl. No.: 09/094,901

[22] Filed: Jun. 15, 1998

Related U.S. Application Data

[63] Continuation-in-part of application No. 08/733,156, Oct. 17, 1996, Pat. No. 5,925,969.
[51] Int. Cl.[7] ............................... H02N 2/04; H02N 2/06
[52] U.S. Cl. ............................................ 310/328; 310/317
[58] Field of Search ...................... 310/317, 328

[56] References Cited

U.S. PATENT DOCUMENTS

| | | | |
|---|---|---|---|
| 4,613,782 | 9/1986 | Mori et al. | 310/323 |
| 5,554,905 | 9/1996 | Gschwind et al. | 310/323 |
| 5,563,465 | 10/1996 | Nakahara et al. | 310/328 |
| 5,712,524 | 1/1998 | Suga | 310/328 |
| 5,714,832 | 2/1998 | Shirrod et al. | 310/328 |

*Primary Examiner*—Thomas M. Dougherty
*Attorney, Agent, or Firm*—John R. Ross; John R. Ross, III

[57] ABSTRACT

A piezoelectric positioner. First and second piezoelectric stacks are mounted on a rigid frame. A T-lever defining a yoke and a lever arm is disposed so that the yoke overlies the piezoelectric stacks. A compression element is position so as to hold in compression both stacks in-between the frame and the yoke. A programmable voltage source is programmed to provide elongating voltages alternatingly to the first and the second stacks to cause the stacks to alternatingly expand against compressive forces produced by the compression element so as to cause the yoke to rock back and forth and to cause the T-lever arm to swing back and forth. A tool beam is flexibly connected to the T-lever arm. A tool beam restraint restrains movement of the tool beam to back and forth motion in a single direction. In a preferred embodiment a tool is mounted on the tool beam.

21 Claims, 13 Drawing Sheets

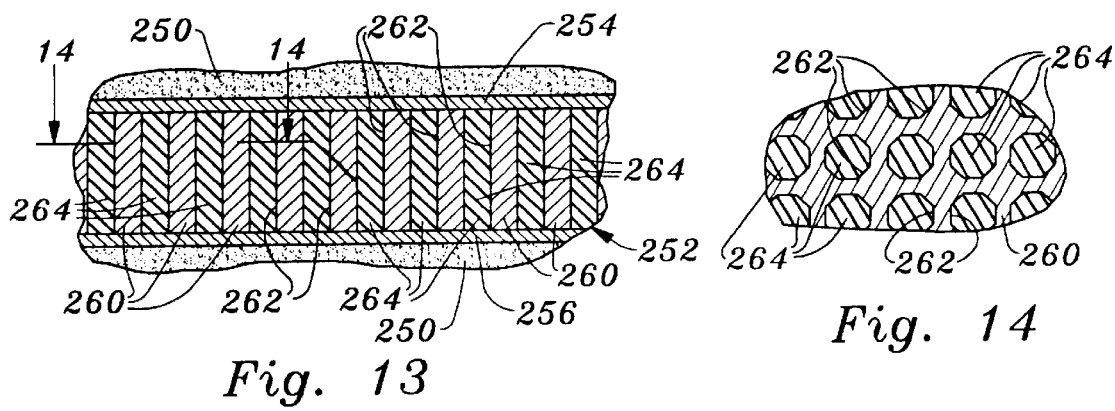
Fig. 13
Fig. 14
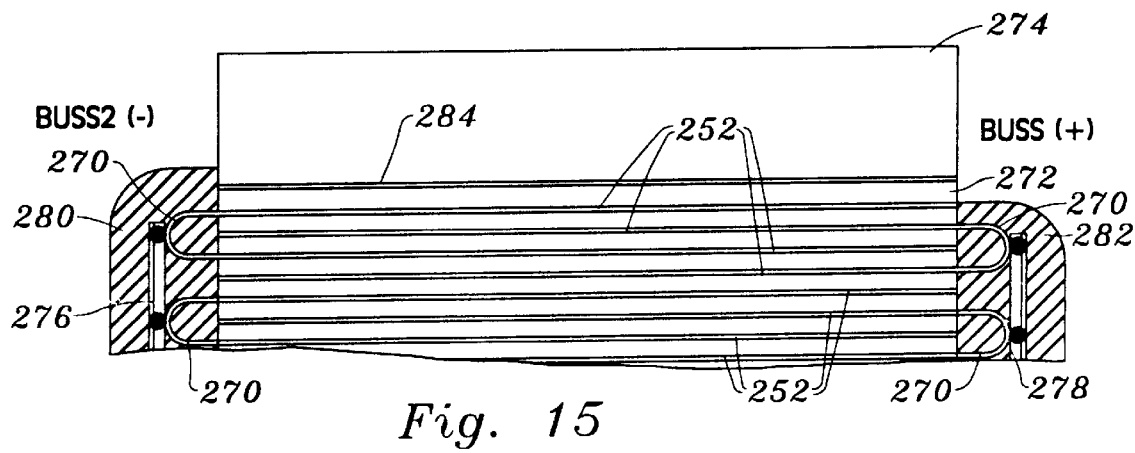
Fig. 15
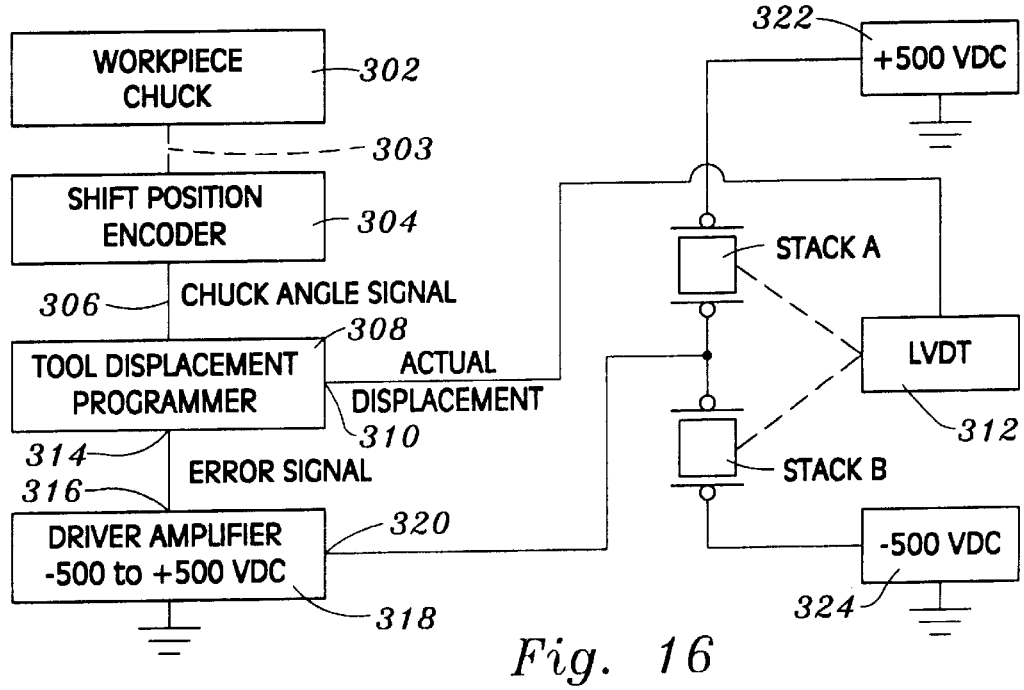
Fig. 16

| CONTROL VOTAGE | (V<sub>A</sub>)L | (V<sub>A</sub>)R | STACK A DISPLACEMENT | (V<sub>B</sub>)L | (V<sub>B</sub>)R | STACK B DISPLACEMENT |
|---|---|---|---|---|---|---|
| 0 | +200 | -200 | MAX/2 | +200 | -200 | MAX/2 |
| +10 | +400 | -400 | MAX | 0 | 0 | MIN |
| -10 | 0 | 0 | MIN | +400 | -400 | MAX |

FIG. 21

PIEZOELECTRIC POSITIONER

This application is a Continuation-In-Part of Ser. No. 08/733,156 filed Oct. 17, 1996, now U.S. Pat. No. 5,925,969. The present invention relates to high precision positioners, and more particularly to piezoelectric tool positioners.

BACKGROUND OF THE INVENTION

High precision tool positioner devices are known in the prior art. However, the piezoelectric drivers of the prior art devices have not completely satisfied the requirements of high precision machine tool applications. For example, certain devices of the prior art have not been sufficiently free from temperature effects to satisfy all of the requirements of precision machine tool designers. In addition, the displacement available from prior art positioners has been insufficient to provide a practical range of displacements for machining. Further, not all tool positioners of the prior art have been capable of providing sufficiently fine displacement control, and resolution is particularly important when employing feedback, to eliminate hysteresis. Yet further, not all tool positioners of the prior art have been capable of precision operation at sufficiently high cyclic rates to satisfy the requirements of precision machine tool designers. This is important because speed, or response, is the most critical requirement.

What is needed is a faster response high precision positioner.

SUMMARY OF THE INVENTION

The present invention provides a piezoelectric positioner. First and second piezoelectric stacks are mounted on a rigid frame. A T-lever defining a yoke and a lever arm is disposed so that the yoke overlies the piezoelectric stacks. A compression element is positioned so as to hold in compression both stacks in-between the frame and the yoke. A programmable voltage source is programmed to provide elongating voltages alternatingly to the first and the second stacks to cause the stacks to alternatingly expand against compressive forces produced by the compression element so as to cause the yoke to rock back and forth and to cause the T-lever arm to swing back and forth. A tool beam is flexibly connected to the T-lever arm. A tool beam restraint restrains movement of the tool beam to back and forth motion in a single direction. In a preferred embodiment a tool is mounted on the tool beam.

BRIEF DESCRIPTION OF THE DRAWINGS

FIGS. 3A and 3B are partial sectional views of the piezoelectric tool positioner of the first preferred embodiment of the present invention.

FIGS. 4, 4A and 4B, which correspond to FIGS. 3, 3A and 3B, show the piezoelectric tool positioner of the first preferred embodiment of the present invention during an outward stroke of its tool beam.

FIGS. 5, 5A and 5B, which correspond to FIGS. 3, 3A and 3B, show the piezoelectric tool positioner of the first preferred embodiment of the present invention during an inward stroke of its tool beam.

FIG. 13 is an enlarged view of a part of the structure shown in FIG. 12.

FIG. 14 is a transverse sectional view of the piezoelectric stack shown in FIG. 13, taken on plane 14—14 of FIG. 13.

FIG. 15 is a sectional view of one end of a piezoelectric stack of the first preferred embodiment of the present invention.

FIG. 16 is a schematic representation of a circuit of the present invention that is adapted for use in a precision machine tool in which the piezoelectric tool positioner of the first preferred embodiment of the present invention is incorporated.

FIG. 21 shows a chart showing the effects of varying control voltage in the circuit of FIG. 20.

DETAILED DESCRIPTION OF THE PREFERRED EMBODIMENT

Applications and Requirements

The piezoelectric driven high precision tool positioner of the present invention has very broad applications. One important application is in high precision machine tools of the kind used in the machining of aspherical lenses, lens molds and the like. In the precision machining of glass and metal elements such as glass or plastic lenses or lens molds it is desirable to achieve very high precision, e.g., of the order of 50 nanometers. In order to achieve this very high resolution, a tool positioner of the present invention may be employed. In such an application a tool positioner of the present invention, having a very high-precision capability and a very fast response characteristic may be incorporated into a precision tool component of the kind sometimes called a "tool servo tractor". In a typical application the tool would need to be capable of performing two full cycles of displacement per revolution of a workpiece chuck when the workpiece chuck is rotating at 100 revolutions per second. The tool positioner would also need to respond to a feedback control system which compares the tool's actual displacement with a 167 Hz output command to generate a correction signal by means of which to hold the actual displacement in very precise correspondence with the displacement commanded in accordance with a stored pattern. The feedback transducer may be a linear variable differential transformer (LVDT) or a fiber optic sensor such as manufactured by MTI and other companies. This feedback transducer should have a response rate of no less than 1 kHz, and preferably 10 kHz.

Principle Elements of the Invention

Figure 17:
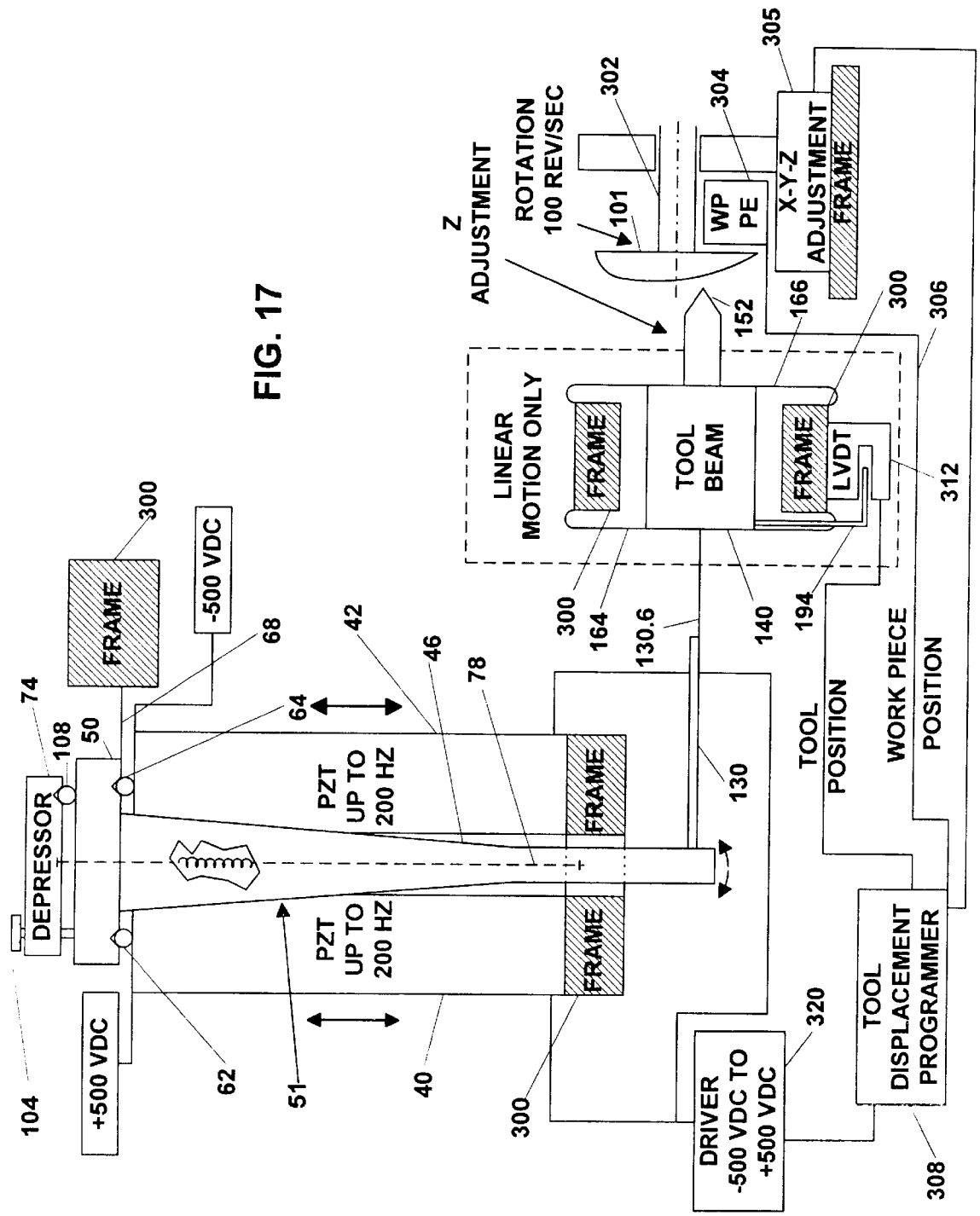
FIG. 17 is a drawing showing the principle elements of the first preferred embodiment of the present invention and demonstrating the operation of the embodiment in the fabrication of a non-axisymmetric generally convex surface.

Referring to FIG. 17, the principle elements of the invention are shown in an embodiment for the fabrication of a non-axisymmetric generally convex surface 101. Piezoelectric (PZ) stacks 40 and 42 are held in compression between yoke plate 50 of T-lever 51 and frame 300. Driver 318 applies alternating voltage to PZ stacks 40 and 42 so that these stacks become respectively electrically excited in their shortening mode and elongation mode. In other words, as stack 40 becomes taller, stack 42 becomes shorter and vice versa. The alternating up and down motion of PZ stacks 40 and 42 produce a rocking motion of T-lever 51 comprised of yoke plate 50 and T-lever arm 46. As T-lever arm 46 swings from side to side, the amplified displacement at the bottom of T-lever arm 46 is transmitted to horizontal back and forth motion of diamond tool 152 through driving strut 130, flexible ear 130.6 and tool beam 140. Work piece 101 is positioned by X - Y - Z adjustment tool 305 and is being rotated by shaft 302.

Depressor 74 is used to hold stacks 40 and 42 in compression between yoke plate 50 and frame 300. Roller 108 fits into depressor 74's groove and over yoke plate 50. Steel tape 78 connects depressor 74 and frame 300 and functions as a spring tensioning mechanism. As cap screw 104 is turned, compressive force can be either increased or decreased on stacks 40 and 42 between frame 300 and yoke 50. Flexure plate 68 connects to yoke plate 50 and frame 300. Flexure plate 68 is flexible so that it allows yoke plate 50 to move with a rocking motion, but it does not allow yoke plate 50 to move horizontally. T-lever arms 46 (shown) and 48 (not shown) extend downward through a groove cut into frame 300. Rigidly connected to T - lever arms 46 and 48 is tool beam driving strut 130. Connected to tool beam driving strut 130 is flexible ear 130.6 which in turn is connected to tool beam 140 which is restrained to horizontal back and forth motion by means of H plates 164 and 166. H - plates 164 and 166 allow for tool beam 140 to move linearly in a horizontal direction, but prevent vertical movement. Diamond tool 152 is rigidly connected to tool beam 140. Linear variable differential transformer (LVDT) 312 is mounted on frame 300 and an armature is mounted on rod 194 attached to tool beam 140. LVDT 312 supplies a signal to tool displacement programmer 308 corresponding to the actual displacement of tool beam 140. Work piece position encoder 304 provides to displacement programmer 308 the radial position of work piece 101. The X, Y, and Z position of work piece 101 is also provided to programmer 308 by electronic signals from X, Y, Z adjustment 305. Thus, tool displacement programmer 308 provides at its output an error signal to correct the voltage generated in driver 320 to match the surface contour which is programmed into tool displacement programmer 308.

First Preferred Embodiment

Figure 1:
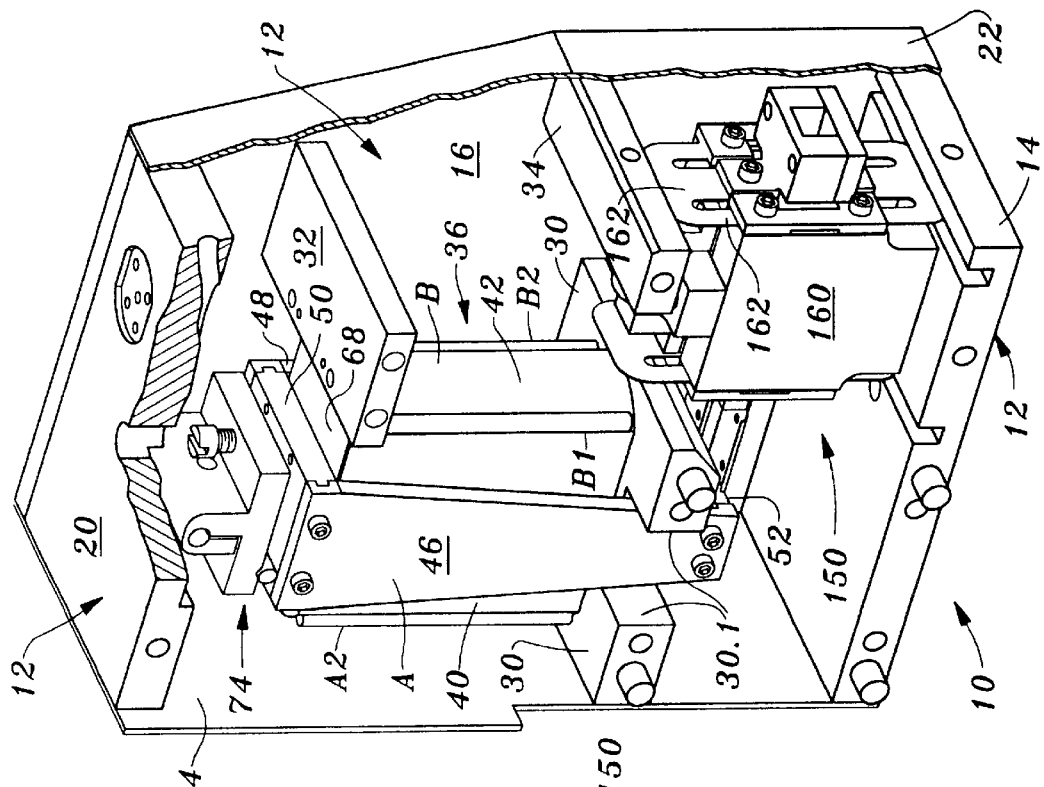
FIGS. 1 and 2 are perspective views of the piezoelectric tool positioner of the first preferred embodiment of the present invention.
Figure 2:
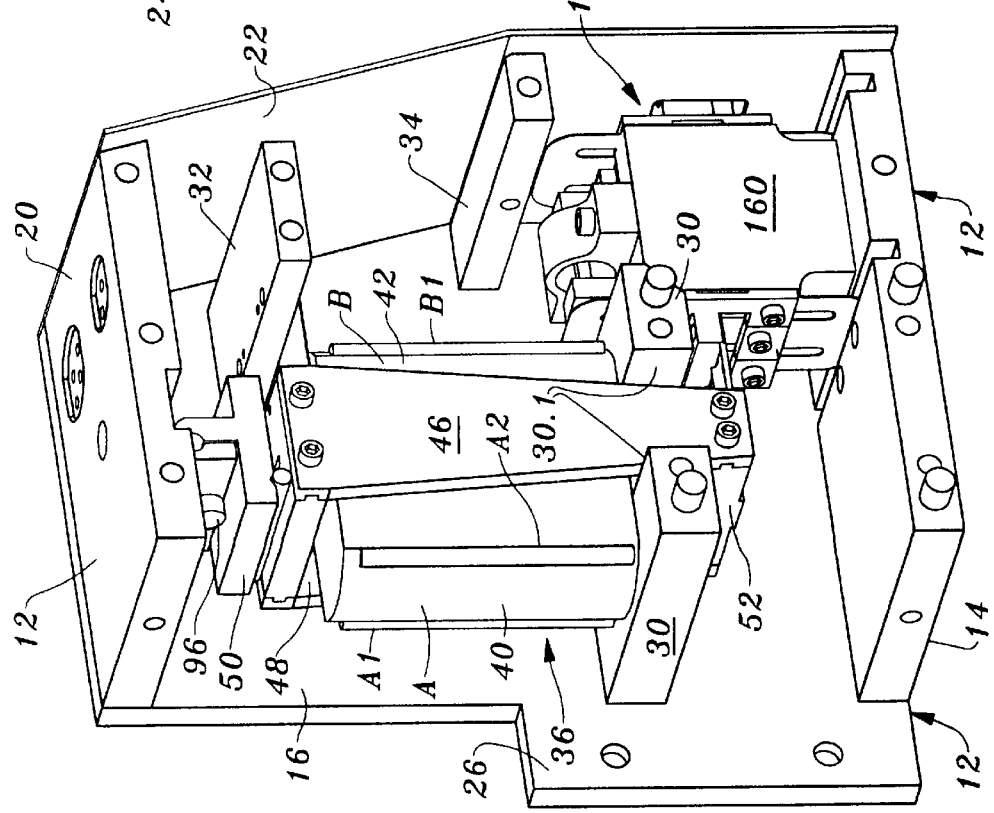

Referring now to FIGS. 1 and 2, there are shown two perspective views of a tool positioner 10 of the first preferred embodiment of the present invention. As may be seen by comparing FIGS. 1, 2 and 6, the active parts of tool positioner 10 are supported in operative collocation by means of a rigid frame 12. Rigid frame 12 is erected upon and includes a rigid steel base plate 14. A pair of rigid steel walls 16, 18 (FIG. 6) are rigidly affixed to the two longest edges of base plate 14 by mean of suitable machine screws and aligning pins, which aligning pins are received in cooperating aligning bores to assure the perpendicularity of walls 16, 18 to the upper face of base plate 14. As may further be seen by comparison of FIGS. 1, 2 and 6, a rigid steel roof plate 20 extends from wall 16 to wall 18, at the upper ends thereof, and is affixed to walls 16, 18 by means of suitable machine screws. It will thus be seen by those having ordinary skill in the art, informed by the present disclosure, that the frame 12 of tool positioner 10 of the first preferred embodiment of the present invention consists of four rigid steel members 12, 16, 18, 20 which are joined together in rigidly maintained mutually parallel and perpendicular relationship. As further seen in FIGS. 1 and 2, a front cover 22 and a back cover 24 are affixed to frame 12, and thus the active parts of tool positioner 10 are substantially completely enclosed.

Walls 16 and 18 are provided, respectively, with ears 26 and 28. Ears 26 and 28 project beyond back cover 24 and are provided with suitable mounting holes whereby tool positioner 10 may be rigidly mounted in apparatus of which tool positioner 10 is a part, e.g., a precision contact lens mold machining device. As further seen in FIGS. 1 and 2, a rigid supporting plate 30 is rigidly mounted within frame 12, by being attached at its opposite ends to walls 16 and 18 by means of suitable machine screws and aligning pins in the well known manner. A rigid anchoring plate 32 is also rigidly mounted within frame 12, its opposite ends being affixed to walls 16 and 18 respectively, by means of suitable machine screws.

Figure 3:
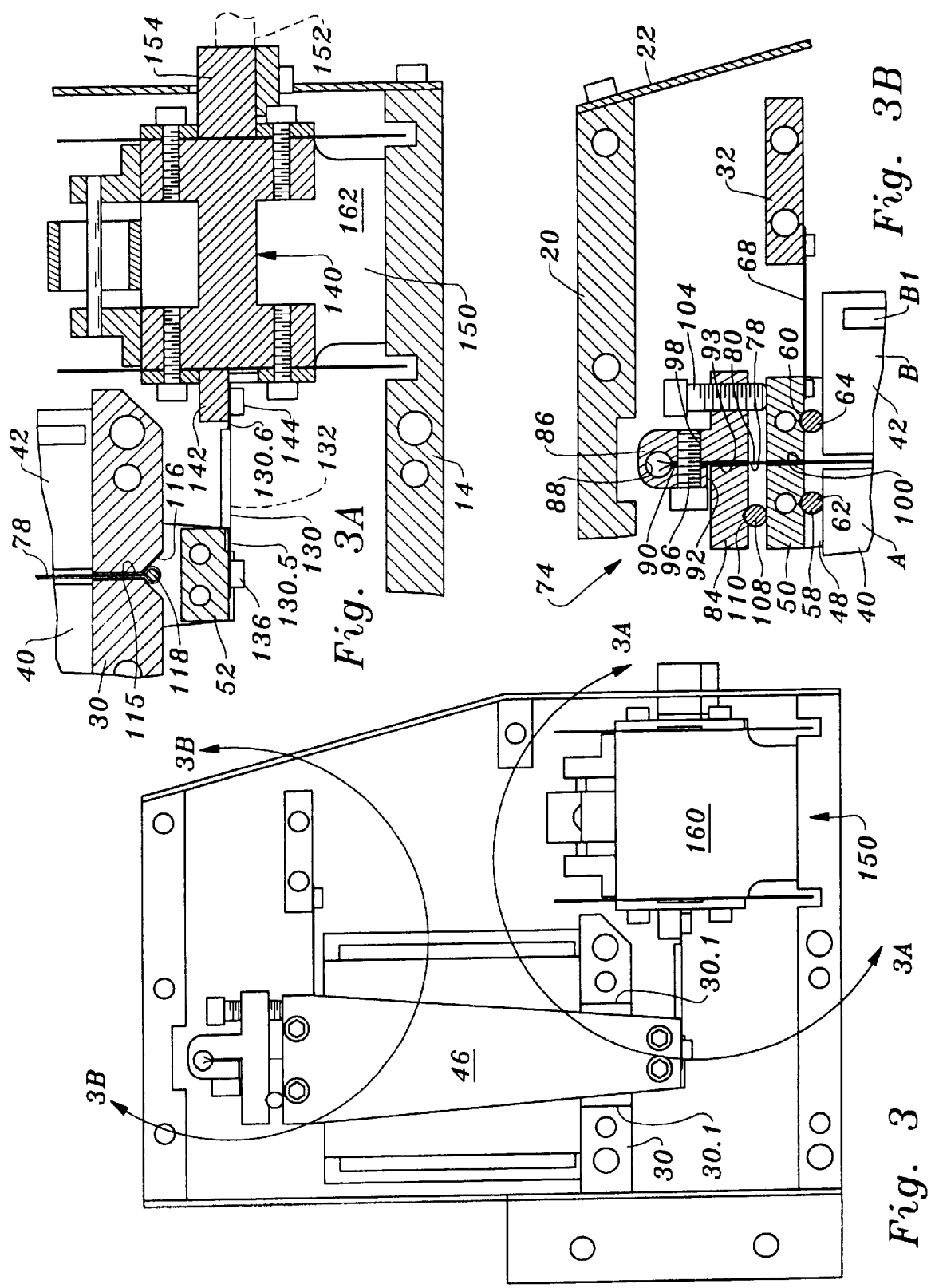
FIG. 3 is an elevational view of the piezoelectric tool positioner of the first preferred embodiment of the present invention.
Figure 6:
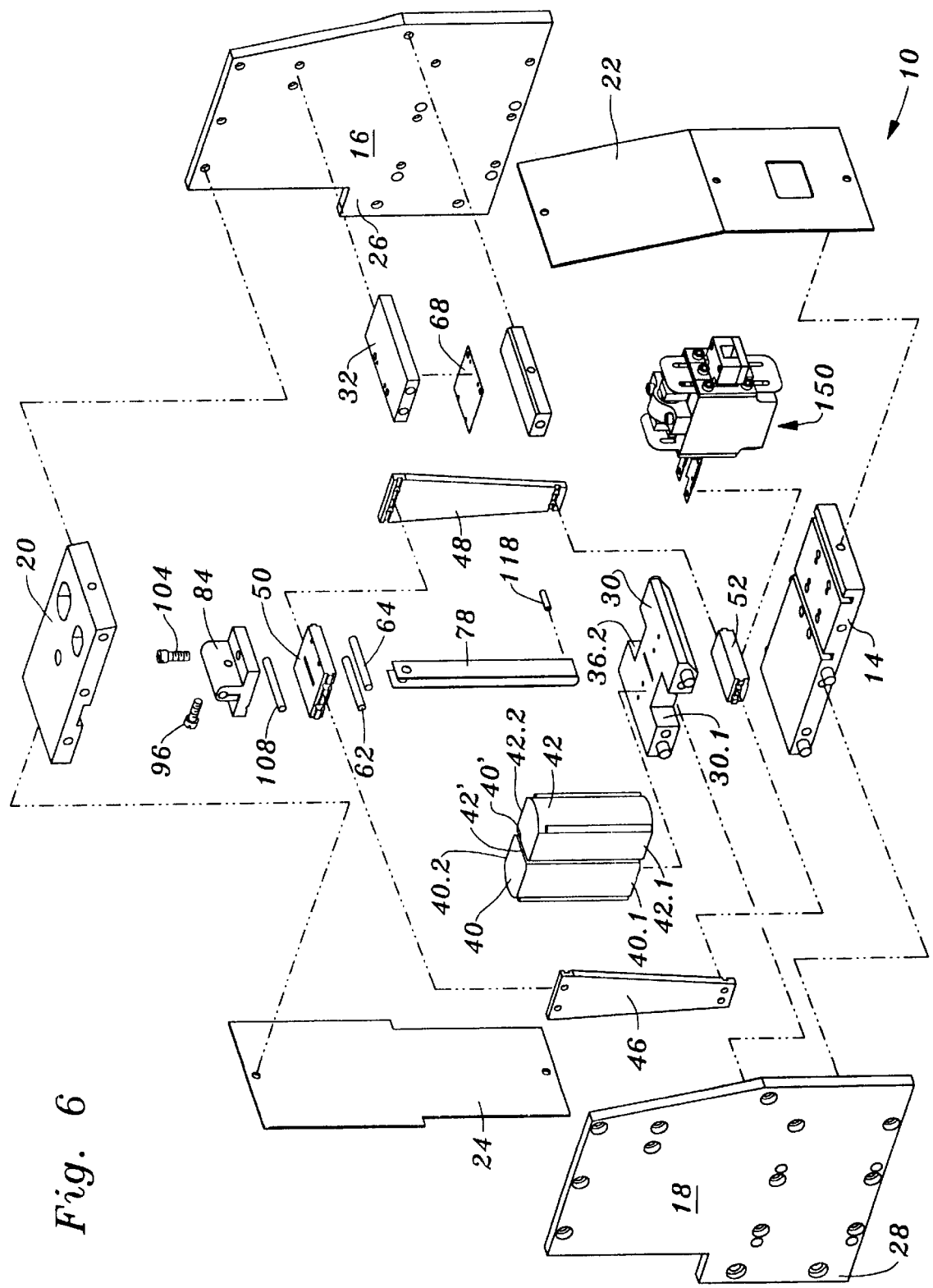
FIG. 6 is an exploded perspective view of the piezoelectric tool positioner of the first preferred embodiment of the present invention.

Additional rigidity of frame 12 is also provided by a cross member 34 the opposite ends of which are affixed, respectively, to walls 16 and 18. The active parts of tool positioner 10 located within frame 12 comprise two principal assemblies, viz., piezoelectric drive assembly 36 and tool beam carrier assembly 150. As best seen by comparison of FIGS. 1, 2, and 6, piezoelectric drive assembly 36 is comprised of two piezoelectric stacks 40 and 42. As best seen in FIG. 6, each piezoelectric stack 40, 42 takes the form of a cylinder having three elongated flattened faces the planes of which are parallel to the axis of the cylindrical face thereof. As also seen FIG. 6, piezoelectric stacks 40, 42 are so juxtaposed that their respective major flat faces 40', 42' are maintained in closely confronting relationship. The internal structure of each of the piezoelectric stacks 40, 42 are described in detail hereinafter in connection with FIGS. 12 through 15. As further indicated in FIG. 6, each piezoelectric stack 40, 42 is positionally located on the upper face of supporting plate 30 by means of suitable dower pins coacting with reamed holes in the lower shoe plates of piezoelectric stacks 40, 42. Also shown in FIG. 6 are the flat faces 40.1 and 40.2 of piezoelectric stack 40, and the flat faces 42.1 and 42.2 of piezoelectric stack 42. As will be best seen in connection with FIGS. 1 and 2, flats 40.1, 40.2, 42,1 and 42.2 are provided for the purpose of preventing interference between T-lever arms 46, 48 and piezoelectric stacks 40, 42. As further seen in FIGS. 1 and 2, piezoelectric stack 40 sometimes is referred to herein as piezoelectric stack A, and piezoelectric stack 42 is sometimes herein referred to as piezoelectric stack B, for the purposes of electrical diagrams such as FIG. 10. As also shown in FIGS. 1 and 2, piezoelectric stack 40 (stack A) is comprised of two epoxy-encapsulated busses A1, A2; and piezoelectric stack 42 (stack B) are comprised of two epoxy-encapsulated busses B1, B2. The structure of these busses will be explained hereinafter in connection with FIG. 15. As best seen in FIGS. 1 and 2, T-lever arms 46 and 48 are joined at their upper ends by a yoke plate or yoke 50, and at their lower ends by a cross brace 52. T-lever arms 46 and 48 are rigidly joined to yoke 50 and cross brace 52 by means of tongue-and-groove joints and suitable machine screws in such manner that the major faces of yoke 50 and cross brace 2 are rigidly maintained perpendicular to the major faces of T-lever arms 46 and 48. Further, the lower ends of T-lever arm 46, 48 can be seen to be received in notches 30.1, 30.2 which are formed in supporting plate 30. As best seen in FIG. 3, notch 30.1 is wider than the lower end of T-lever arm 46 and thus T-lever arm 46 can undergo small displacements from side-to-side within notch 30.1. As will be understood by those having ordinary skill in the art, informed by the present disclosure, T-lever arm 48 (FIG. 6) coacts in the same manner with notch 30.2 of supporting plate 30.

Yoke Plate Retains Horizontal Position and Permits Rocking Motion

Referring now to FIG. 3B, it will be seen that a pair of transverse grooves or channels 58, 60 are provided in the bottom of yoke plate 50, and that these channels or grooves are of triangular cross-section. As also seen in FIG. 3B, a roller 62 is captive between channel 58 and the upper surface of piezoelectric stack 40, and a roller 64 is captive between channel 60 and the upper surface of stack 42. Referring again to FIG. 3B, it will be seen that a flexure plate 68 (FIG. 6) is affixed at its opposite edges to yoke plate 50 and anchor plate 32 by suitable machine screws. As will now be understood by those having ordinary skill in the art, informed by the present disclosure, flexure plate 68 prevents transverse motion of yoke plate 50 with respect to stacks 40, 42, and at the same time permits tilting or rocking motion of yoke plate 50, as may be seen by comparison of FIG. 3B, FIG. 4B, and FIG. 5B. Comparing FIGS. 1, 2, and 3B, it will be seen that a depresser assembly 74 overlies yoke plate 50.

Depresser Provides Pre-loading to Both Stacks

As seen in FIG. 3B, the upper end of a loop of steel tape 78 is captive in depresser 74. As seen in FIG. 3B, tape 78 extends upwardly through a slot 80 formed in the main body 84 of depresser 74. Extending upwardly from main body 84 and integral therewith is a clamp portion 86 of depresser 74. A bore 88 extends from side to side of clamp portion 86, and a slot 90 extends downwardly from bore 88 to slot 92 which defines the lower end of movable jaw 93 of clamping portion 86. A cap screw 96, sometimes called the "clamping screw" is engaged with a tapped hole 98 in the fixed jaw of clamping portion 86, and passes through a clearance hole in movable jaw 93. As seen in FIG. 3B, the head of clamping screw 96 bears against the outer surface of movable jaw 93. Thus it will be evident to those having ordinary skill in the art that by means of clamping screw 96 movable jaw 93 of clamping portion 86 can be forced against its associated fixed jaw, whereby to clamp the two upper ends of tape 78 firmly to depresser 74. As seen in FIG. 1, there is but one clamping screw 96. As seen in FIG. 6, two elongated holes are provided in the respective ends of tape 78 to accommodate clamping screw 96. As will now be seen by those having ordinary skill in the art, informed by the present disclosure, the two ends of tape 78 pass upwardly through slot 80, thence upwardly through slot 90, and extend into bore 88. Thus, a preliminary tightening of tape 78 can be accomplished by means of, say, long-nose pliers grasping the upper ends of tape 78 which project into bore 88. The upper ends of tape loop 78 are then clamped tightly in clamping portion 86 by setting up clamping screw 96 against movable jaw 93. As also seen in FIG. 3B, tape loop 78 extends downwardly from main body 84 and thence through a slot 100 in yoke plate 50, where after it further extends downwardly between poles 40 and 42. As further seen in FIG. 3B, additional tension can be applied to tape loop 78 by means of a cap screw 104 which serves to pivot depresser main body 84 about a roller 108 which bears upon the top surface of yoke plate 50. As also seen in FIG. 3B, roller 108 is captive in a groove 110 of triangular cross-section which is formed in the lower face of main body portion 84. Referring now to FIG. 3A, it will be seen that the lower end of tape loop 78 passes through a slot 115 provided in supporting plate 30. As there seen, a groove or channel 116 of triangular cross-section is provided in the lower face of supporting plate 30 and slot 115 terminates in the apex of groove or channel 116. The lower end of tape loop 78, i.e., the central portion thereof, passes around a rod 118 which is contained in channel 116. As also seen in FIG. 3A, tape loop 78 passes between stacks 40 and 42. As will now be evident to those having ordinary skill in the art, informed by the present disclosure, tape loop 78 is secured to supporting plate 30 and to depresser 74, and thus rollers 62 and 64 (FIG. 3B) are pressed against the respective tops of stacks 40 and 42.

Unexcited State

Referring again to FIG. 3B, it is to be understood that the apparatus of the first preferred embodiment of the present invention is shown in its unexcited state. That is to say, stacks 40 and 42 are not electrically excited. Since stacks 40 and 42 are not electrically excited the top surfaces of stacks 40 and 42 lie in the same horizontal plane, and thus the upper face of yoke plate 50 is substantially horizontal. Since the upper face of yoke plate 50 is substantially horizontal, and T-lever arms 46 and 48 are rigidly affixed to yoke plate 50 with their center lines perpendicular to yoke plate 50, it follows that T-lever arms 46 and 48 are vertically disposed, and thus that cross brace 52 is at the center of its stroke.

Excited State

Figure 4:
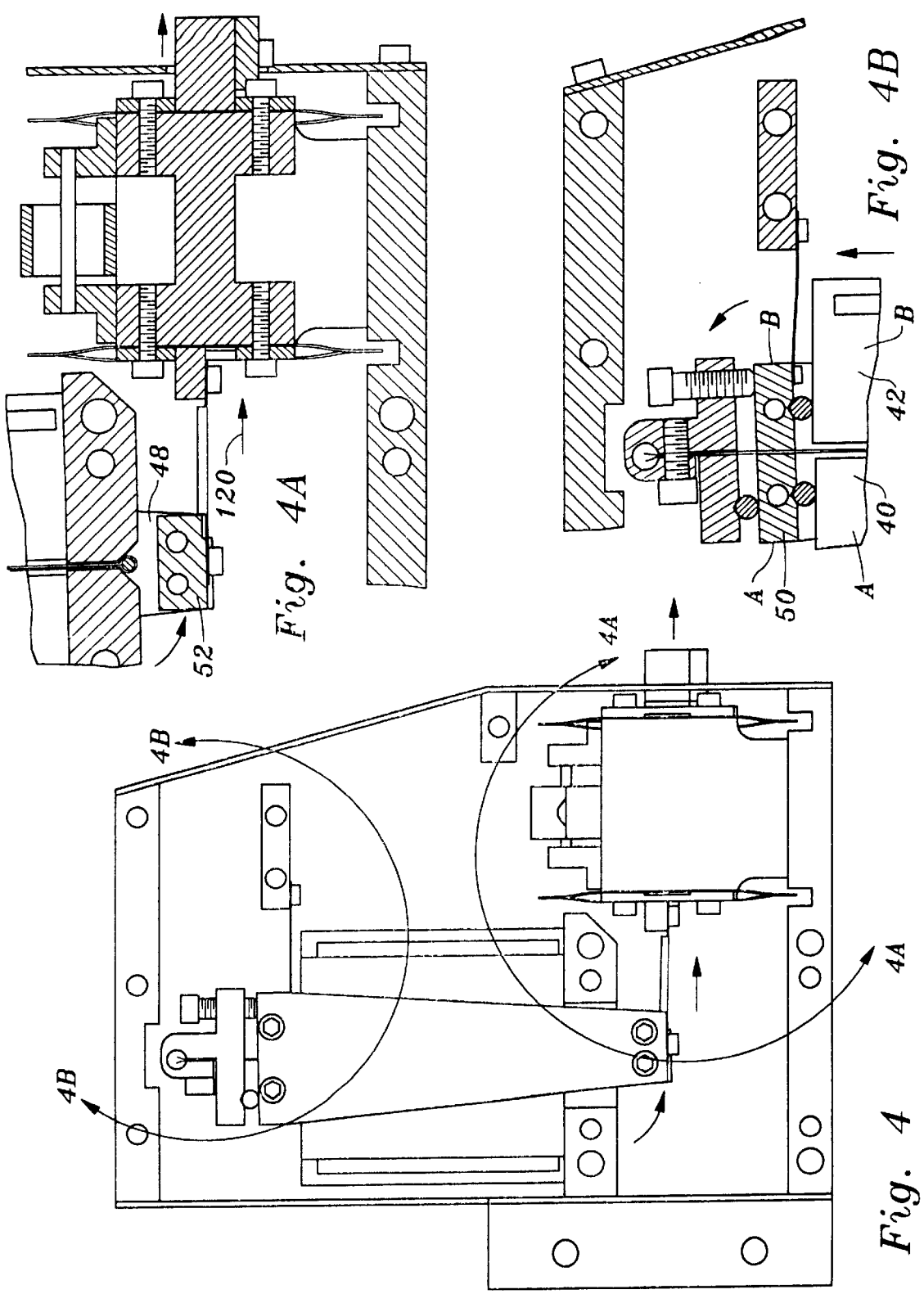
Figure 5:
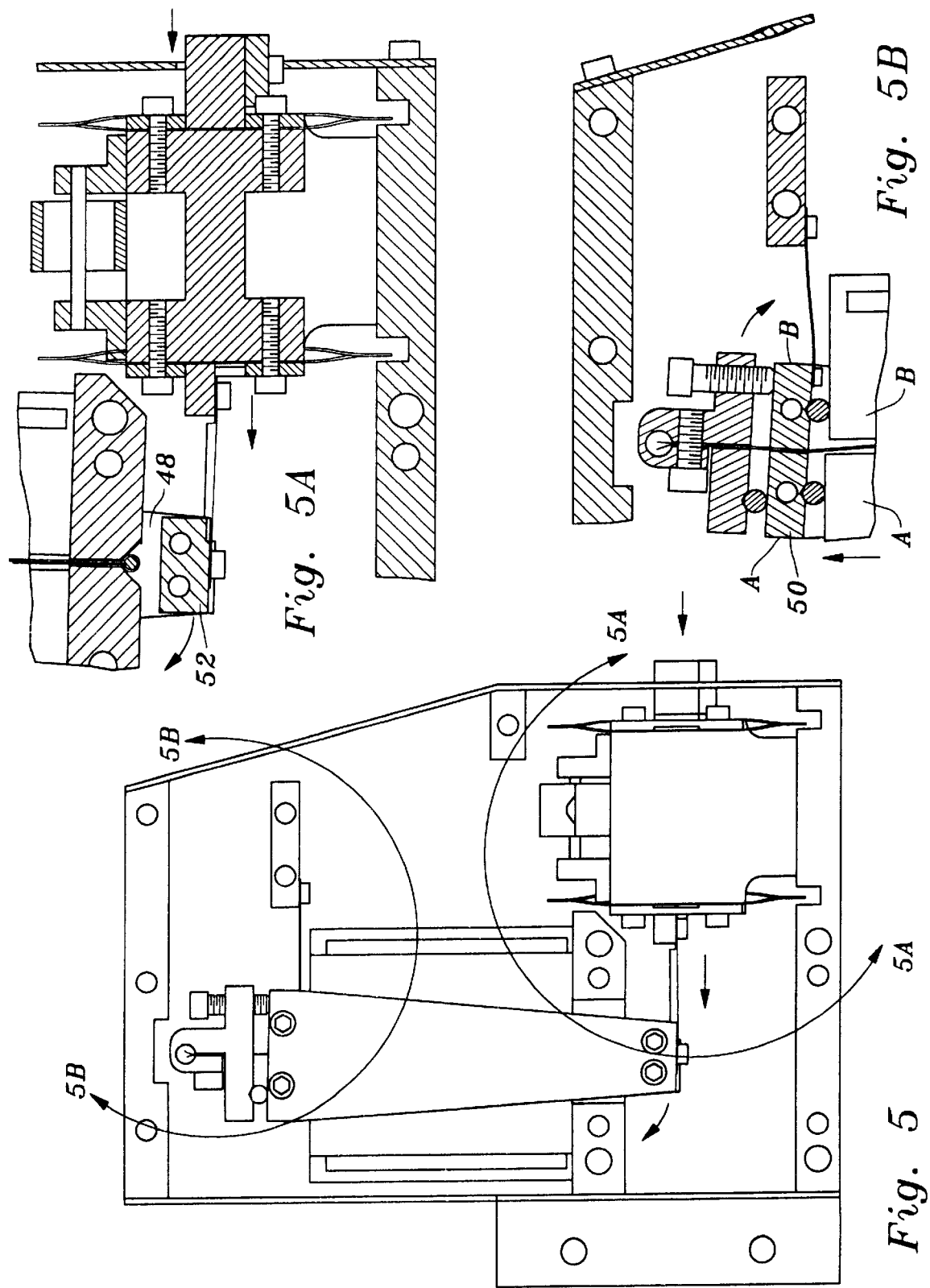

Referring now to FIGS. 4A and 4B, it will be seen in FIG. 4A that the top of stack 42 is elevated above the top of stack 40, because these stacks are respectively electrically excited in their shortening mode and elongation mode by associated electrical circuits which will be described hereinafter. Thus, as seen in FIG. 4B, yoke plate 50 is tilted so that its B-edge (located above stack B) is elevated above its A-edge (located above stack A). Since cross brace 52 is joined into a rigid frame with yoke plate 50 by T-lever arms 46, 48, it follows that the tilting of yoke plate 50 causes cross brace 52 (FIG. 4A) to move rightwardly toward its maximum displacement as shown by arrow 120. Similarly, as shown in FIG. 5B, the excitation of stacks A and B in opposite polarity to the excitation applied in FIG. 4B causes yoke plate 50 to be tilted in the opposite direction, i.e., with it's A-edge elevated above its B edge. It follows, as shown in FIG. 5A, that cross-brace 52 is moved inward, in a direction opposite to the outward movement shown in FIG. 4A.

Alternating Excitation

Thus it will be seen by those having ordinary skill in the art, informed by the present disclosure, that alternating excitation of stacks 40 and 42, i.e., in alternating polarity, causes cross brace 52 to execute successive outward and inward strokes, as shown respectively in FIG. 4A and FIG. 5A.

Braces

Figure 7:
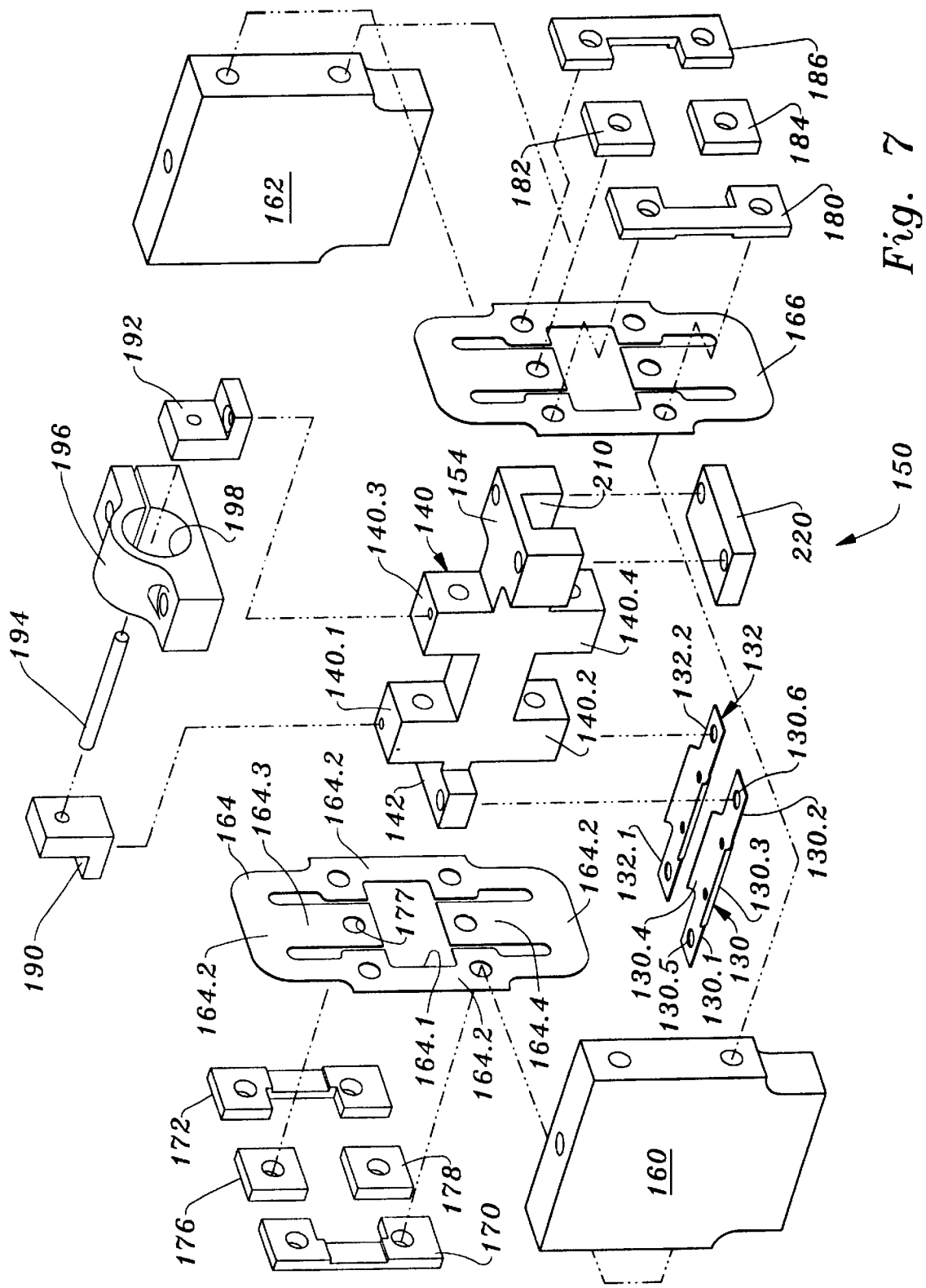
FIG. 7 is an exploded perspective view of the tool beam carrier assembly of the piezoelectric tool positioner of the first preferred embodiment of the present invention.

As may be seen by comparison of FIG. 3A and FIG. 7, a pair of tool beam driving struts 130, 132 extend between cross brace 52 and tool beam 140. As seen in FIG. 7, each strut 130, 132 is provided with upturned rigidifying flanges, e.g., 130.3, 130.4, and is provided at each end with a flexible ear, e.g., 130.5, 130.6. Referring again to FIG. 3A, it will be seen that inner ear 132.5 of strut 132 is affixed to cross brace 52 by means of a suitable cap screw 136. The inner ear of strut 132 is affixed to cross brace 52 in the same manner. As further seen in FIG. 3A, the outer ear 130.6 of strut 130 is affixed to integral crossbar 142 of tool beam 140 by means of a cap screw 144. The outer ear 132.6 of strut 132 is also affixed to integral cross bar 142 of tool beam 140, in the same manner.

Short Strokes

As will be explained hereinafter, tool beam 140 is suspended in tool beam carrier assembly 150 for longitudinal movement over a short stroke. By "longitudinal movement" it is meant movement from side to side as seen in FIG. 3A, tool beam 140 remaining at substantially the same elevation from base plate 14 throughout said short stroke. It is to be understood that tool beam carrier assembly 150 constitutes a principal feature of the present invention, and that by the use of tool beam carrier assembly 150 the problem of "stiction" which would obtain if tool beam 140 were slidably mounted is eliminated. It follows, then, that the inward and outward movements of cross brace 52 are precisely followed by tool beam 140, and that any tool 152 which is clamped in the tool clamp located at the outer end 154 of tool beam 140 also faithfully reproduces the movement of cross brace 52.

H - Plate

Referring now to FIG. 7, it will be seen that tool beam carrier assembly 150 is comprised of two supporting plates 160, 162. As may be seen by comparison of FIGS. 1, 2, 3 and 3A, supporting plates 160 and 162 are affixed to base plate 14, as by means of suitable set screws, and that clearance slots 14.1, 14.2 (FIG. 2) are provided in base plate 14 to accommodate the lower ends of H-Plates 164, 166. Returning to FIG. 7, it will be seen that tool beam carrier assembly 150 is further comprised of a pair of thin, flexible H-plates 164, 166, which are fabricated, e.g., from stainless steel shim stock. Taking H-plate 164 as an example, it will be seen in FIG. 7 that H-plate 164 is provided with a central window 164.1, an outer frame 164.2, and two fingers 164.3, 164.4 projecting from said frame inward to the edge of window 164.1. H-plate 166 is substantially identical to H-plate 164. As seen by comparison of FIGS. 7 and 8, H-plate 164 is affixed to the corresponding ends of supporting plates 160, 162 by means of four cap screws 168 which pass through retainers 170, 172, thence through corresponding holes in frame 164.2, and thence into corresponding tapped holes in the ends of supporting plates 160, 162. The outer H-plate 166 is similarly affixed to the opposite ends of supporting plates 160, 162. As also seen in FIG. 7, the upwardly and downwardly projecting ears 140.1, 140.2, 140.3 and 140.4 of tool beam 140 are affixed, respectively, to the inner ends of fingers 164.3, 164.4, 166.3, 166.4 of H-plates 164, and 166. Thus, for example, upwardly projecting ear 140.1 of tool beam 140 is affixed to the outer end of downwardly projecting finger 164.3 of H-plate 164 by means of a cap screw 175 which passes through retainer 176, thence through hole 177 in the outer end of finger 164.3 and thence into a tapped hole in upwardly projecting ear 140.1 of tool beam 140. Upwardly projecting ear 164.4 is similarly affixed to lower ear 140.2 of tool beam 140 by means by means of a tap screw which passes through the central hole in retainer 178 (FIG. 7), thence through the hole in the outer end of finger 164.4 and thence into a tapped hole in ear 140.2 of tool beam 140. It is to be understood that H-plate 166 is assembled to ears 140.3 and 140.4 of tool beam 140 by means of cap screws passing through retainers 182, 184 in the same manner in which H-plate 164 is affixed to ears 140.1, 140.2 of tool beam 140.

L - Bracket

Figure 8:
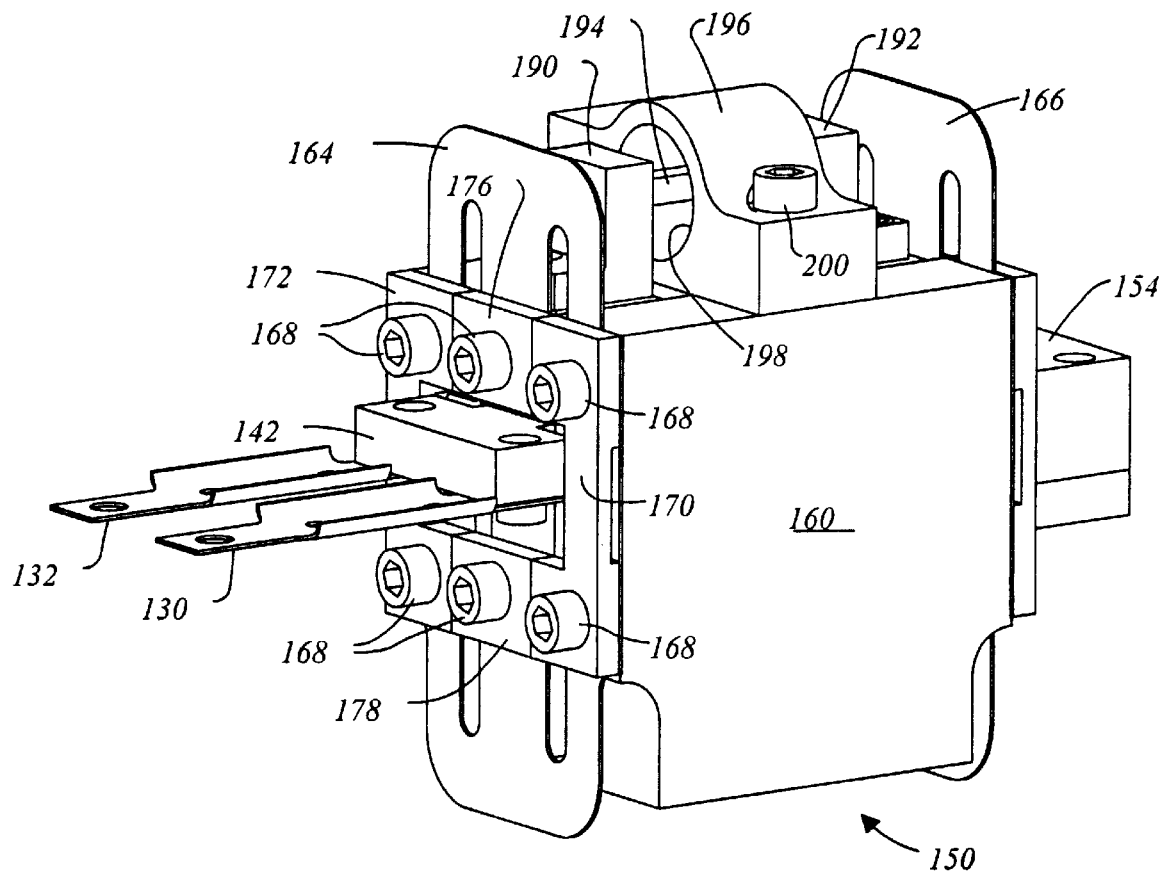
FIG. 8 is a perspective view of the tool beam carrier assembly of the piezoelectric tool positioner of the first preferred embodiment of the present invention.

Again comparing FIGS. 7 and 8, it will be seen that a pair of L-shaped brackets 190, 192 are affixed, respectively, to the upper ends of upper ears 140.1 and 140.3 of tool beam 140. Thus, it will be seen that L-brackets 190, 192 move in synchronism with tool beam 140. As also there seen, a rod 194 is affixed at its opposite ends to respective L-brackets 190, 192, and thus moves in synchronism with tool beam 140.

Differential Transformer

Housing 196 having a large central opening 198 is affixed to the top surfaces of supporting plates 160, 162 by suitable cap screws, e.g., 200 (FIG. 8). In accordance with the preferred embodiment of the present invention, the armature of a linear variable differential transformer (LVDT) is affixed to rod 194, and the winding assembly of the same linear variable differential transformer is fixed in bore 198 of housing 196. As will be obvious to one having ordinary skill in the art, informed by the present disclosure, the signals provided by this linear variable differential transformer, when suitably excited, are in substantially exact proportion to the displacement of tool beam 140 from its central (undeflected) position.

Cavity for Tool Shank

Referring again to FIG. 7, it will be seen that the outer end 154 of tool beam 140 contains a cavity 210. Cavity 210 is configured to tight-fittingly receive the shank of a tool that is to be driven by tool positioner 10 of the first preferred embodiment of the present invention. As seen in FIG. 7, a plate 220 is adapted to be affixed to the lower face of outer end 154 of tool beam 140, as by means of suitable cap screws. As will be evident to those having ordinary skill in the art, informed by the present disclosure, many other means of mounting associated tools on tool beam 140 may be employed in particular applications of the present invention. Further, when the particular tool receiving means of the first preferred embodiment shown in FIG. 7 is employed, locking bosses for locking the associated tool in place in cavity 210 may be provided, e.g., on the top plate 220, and on the inner horizontal face of cavity 210, which locking bosses are received in suitable indentations in the associated walls of cavity 210.

Suspension Tape

Figure 9:
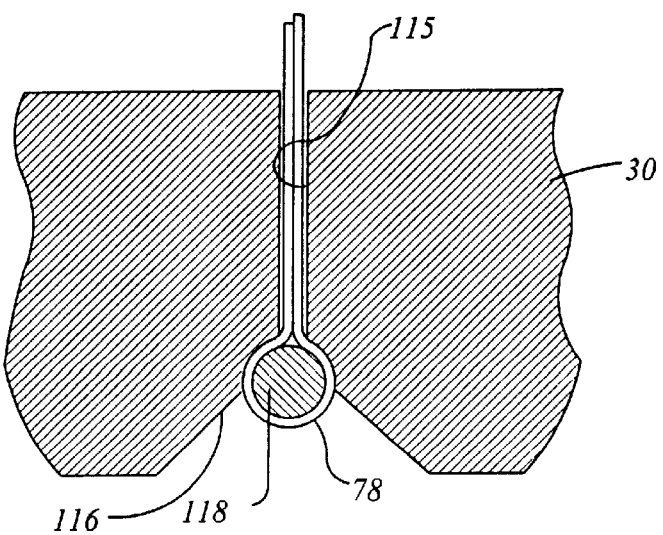
FIG. 9 is a partial sectional view of the piezoelectric tool positioner of the first preferred embodiment of the present invention.

Referring now to FIG. 9 there is shown in detail the lower end of suspension tape 78 and its mode of affixation to supporting plate 30 by means of pin 118 which, with the lower end of tape 78, engages in groove or channel 116 formed in the lower face of supporting plate 30. As seen in FIG. 9, both sides of suspension 78 extend upward through a slot 115 formed in supporting plated 30, which slot terminates in the apex of groove 116.

Excitation Circuit

Figure 10:
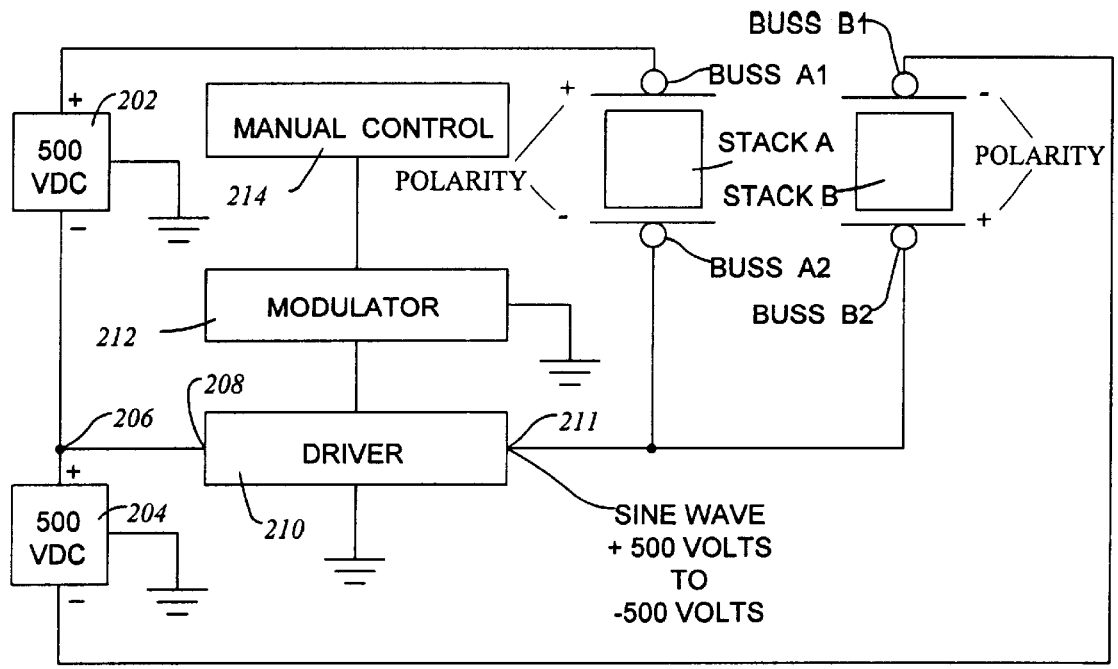
FIG. 10 is a schematic diagram of a circuit of the present invention that may be used to excite the piezoelectric tool positioner of the first preferred embodiment of the present invention.
Figure 11:
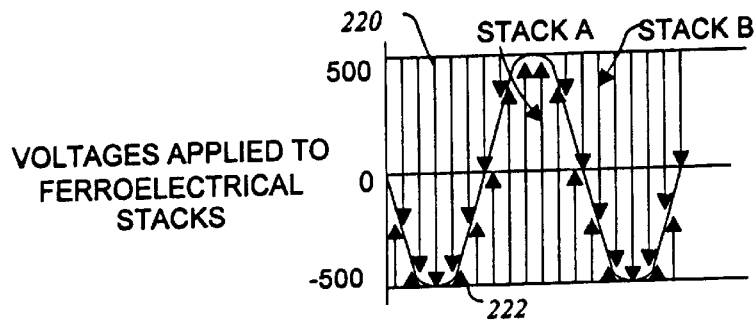
FIG. 11 is a schematic representation of typical waveforms of the electric signals applied to the piezoelectric stacks of the piezoelectric tool positioner of the first preferred embodiment of the present invention.

Referring now to FIG. 10, there is shown a schematic diagram of a circuit of the present invention which may be used to excite the piezoelectric tool positioner of the first preferred embodiment of the present invention for test purposes. Testing circuit 200 is comprised of two 500-volt DC supplies 202, 204. The positive terminal of power supply 202 is directly, conductively connected to buss A1 of stack A. The negative terminal of power supply 204 is directly, conductively connected to buss B1 of stack B. The negative terminal of power supply 202 is directly, conductively connected to common point 206 and the positive terminal of power supply 204 is directly, conductively connected to common point 206. The output wave form of driver circuit 210 appearing at output terminal 211 is modulated by modulator 212 in such manner that the wave form of the voltage appearing at output terminal 211 takes the form of a sine wave having a maximum positive peak value of 500 volts and a maximum negative peak value of –500 volts. The operation of modulator 212 is controlled by a manual control 214, whereby the positive and negative peak amplitudes of the output sine wave appearing at terminal 211 of driver 210 may be made to assume any desired value, ranging from said maximum peak values to zero volts. As shown in FIG. 10, buss A2 of stack A and Buss B2 of stack B are both directly, conductively connected to output terminal 211 of driver 210. Referring now to FIG. 11, there is shown a sinusoidal waveform representing, respectively, the voltages applied between the busses of the two stacks A and B. The arrows below waveform 222 represents the voltage potential applied between buss A1 and buss A2 of stack A, and, at the same time, the arrows above waveform 222 represents the voltage potential applied between buss B 1 and buss B2 of stack B.

Prototype Embodiment

Figure 20:
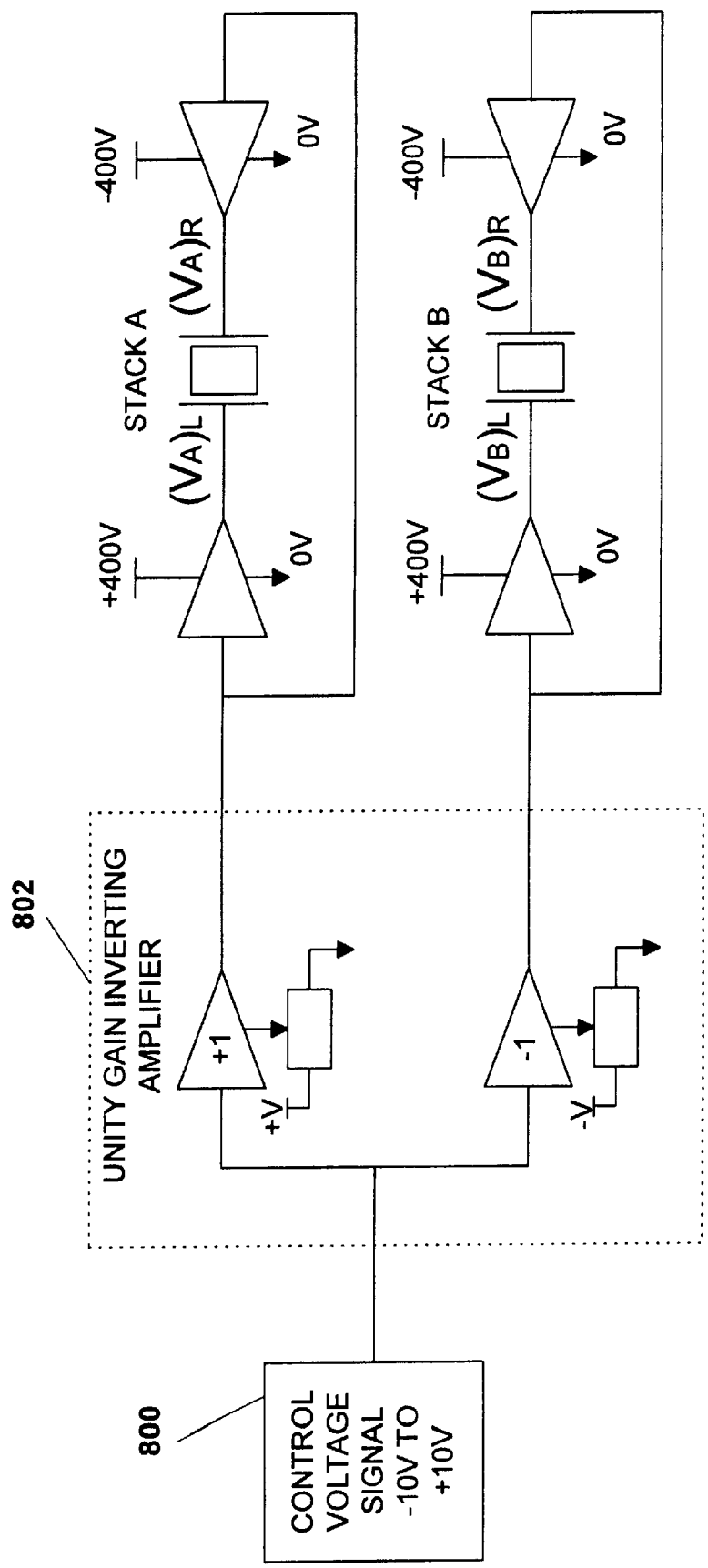
FIG. 20 shows a preferred embodiment employing a unity gain inverting amplifier.

A particular preferred embodiment actually built and marketed by applicant's employer is shown in FIG. 20. The device employs two amplifier modules that drive the stacks from common source input 800. The drive out put for Stack B is the inverse of the drive output for Stack A by means of a unity gain inverting amplifier 802. Each stack is driven in a bridge type configuration that allows a full 800V supply range to be applied across it, in the manner shown in FIG. 20. FIG. 21 shows a chart of the effects of the varying control voltage signal that can be varied at a very high rate such as 200 HZ.

Piezoelectric Ceramic Disks

Figure 12:
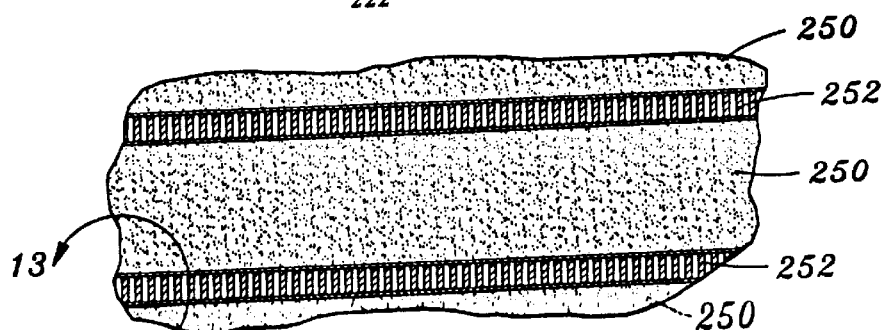
FIG. 12 is a partial sectional view of one of the two piezoelectric stacks of the piezoelectric tool positioner of the first preferred embodiment of the present invention.

Referring now to FIG. 12, there is shown a partial sectional view of one of the two piezoelectric stacks of the piezoelectric tool positioner of the first preferred embodiment of the present invention. Areas 250 of FIG. 12 represent, in section, three of the piezoelectric ceramic disks that are representative of the active elements of both stacks A and B. Disks 250 are fabricated from a lead zirconate titanate ceramic material with various added dopants, and preferably from the piezoelectric ceramic material PZWT100 commercially sold by Kinetic Ceramics, Inc. of Hayward, Calif., U.S.A.

Intermediate Structures

A detailed representation of the intermediate structures 252 shown in FIG. 12 is found in FIGS. 13 and 14. Layers 254 and 256 shown in FIG. 13 are vacuum plated aluminum, plated on the adjoining ceramic disks 250 the thickness of each of which is 8000 to 10000 Angstroms. All of the active disks 250 are thus aluminum plated on both sides. As best seen by comparison of FIGS. 13 and 14, a sheet 260 of beryllium copper is disposed between the aluminum-plated faces of the two disks 250 shown in FIG. 13. As also shown by comparison of FIGS. 13 and 14, a plurality of passages 262 of hexagonal cross-section pass completely through beryllium copper sheet 260. As also shown in FIGS. 13 and 14, each of the hexagonal passages 262 is completely filled with epoxy cement 264. The filling occurs during a vacuum preceded bonding operation in which epoxy cement is flooded to the stack after hard vacuum preparation.

Piezoelectric Stacks

Referring now to FIG. 15 there is shown a sectional view of one end of a piezoelectric stack of the first preferred embodiment of the present invention. As seen in FIG. 15, bridges 270 interconnect alternate ones of the intermediate structures 252 (FIG. 13). Bridges 270 are preferably fabricated from and integral with the beryllium copper sheeting 260 of the two intermediate structures 252 that they connect electrically.

A disk 272 formed from the same material as active disks 250 and left in an unpoled state is affixed to the upper face of the uppermost intermediate structure 252 and a thicker steel shoe plate 274 is affixed to the outer face of passive ceramic disk 272. It is to be understood that a substantial identical passive disk 272' and a steel shoe plate 274' are affixed to the opposite end of the piezoelectric stack the upper end of which is shown in FIG. 15. As also seen in FIG. 15, alternate ones of the pairs of intermediate assemblies 252 are connected, respectively, to busses 276 or 278 by way of their bridges 270, which are brazed, respectively, to busses 276 and 278. As further seen in FIG. 15, busses 276 and 278 and their associated bridge structures are encapsulated in epoxy ridges 280, 282 which extend substantially from end to end of the piezoelectric stack the top of which is shown in section in FIG. 15. It is to be also noted that shoe plate 274 is affixed to passive ceramic disk 272 by means of a beryllium copper disk 284 which is substantially identical to the beryllium copper disk 260 shown in FIGS. 13 and 14, and the hexagonal passages of which are filled with epoxy cement, by means of which shoe plate 274 is bonded to passive ceramic disk 272, the only substantial difference being that no electrical connection means is provided for making an electrical connection to beryllium copper sheet 284. Passive disk 272' and shoe plate 274' are joined in the same manner.

In the preferred embodiment of the present invention beryllium copper disks 260 may be from 1 to 2 mils (0.001 inches to 0.002 inches) thick, and ceramic disks 250 may be from 18 mils to 20 mils (0.0018 inches to 0.020 inches) thick. The number of ceramic disks 250 varies in accordance with such factors as available exciting voltage, thickness of the available ceramic disks, etc., and the disks in a typical stack may range in number from 60 to 200 or more. In the first preferred embodiment each stack is approximately one inch in diameter and 1.6 inches high. It is further to be under stood that in any stack used in the referred embodiment of the present invention, there will be an even number of active disks 250, and that alternate intermediate structures 252 will be connected to opposite busses, and therefore excited alternately in opposite polarity. For this reason, alternate disks 250 are of opposite polarity. Thus, it will be understood that in any stack of the first preferred embodiment of the present invention the uppermost electrode or intermediate element 252 and the lowermost electrode or intermediate element 252 will be connected to the same buss 276, which will preferably be the ground electrode.

Precision Machine Tool

Referring now to FIG. 16, there is shown a schematic representation of a circuit of the present invention which is adapted for use in precision machine tools in which the piezoelectric tool positioner of the first preferred embodiment of the present invention is incorporated. Seen in FIG.

16 is a workpiece chuck 302 in which is clamped the workpiece to be operated upon by tool 152 (FIG. 3A). Workpiece chuck 302 is coupled by suitable coupling means 303 of well known type to a shaft position encoder 304 which provides an electrical signal on output buss 306 which represents the instantaneous angular position of workpiece chuck 302 about its axis. The chuck angle signal on buss 306 is supplied to a tool displacement programmer 308 which is programmed in accordance with the contour of the surface desired to be produced in the workpiece clamped in workpiece chuck 302. As seen in FIG. 16, tool displacement programmer 308 receives at its input terminal 310 a signal corresponding to the actual displacement of the tool, i.e., to the actual displacement of tool beam 140 (FIG. 7), which signal is supplied by the linear variable differential transformer 312 the winding of which is mounted in housing 196 of tool beam carrier assembly 150 (FIG. 7), and the armature of which is affixed to armature rod 194 (FIG. 7). Thus, tool displacement programmer 308 provides at its output terminal 314 an error signal which is applied to input terminal 316 of driver amplifier 318. Driver amplifier 318, accordingly, produces at its output terminal 320 an alternating voltage which is supplied to stack A and stack B in the manner indicated in FIG. 16, thus causing the tool which is operating upon the workpiece clamped in workpiece chuck 302 to be momentarily positioned in such a manner as to generated upon the workpiece the surface contour which is programmed into tool displacement programmer 308. The 500 volt DC power supplies 322 and 324 function in the same manner and for the same purpose as the two 500 volt DC power supplies 202 and 204 shown in FIG. 10.

Alternative Method for Compressing Piezoelectric Stacks

The first preferred embodiment utilizes steel tape 78 to apply compressive force to stacks 40 and 42, as shown in FIG. 6. However, the degree of compressive force that may be applied is limited by the strength of steel tape 78. In other words, if steel tape 78 is pulled too tightly, it will eventually permanently deform or snap. The result of tape 78 being too loose, can be seen by reference to FIG. 17. As vertical force is developed through the up and down movement of PZ stacks 40 and 42, yoke 50 of T-lever 51 can lift out of contact with rollers 62 or 64 as a result of exceeding the pre-load applied by the tape 78. In addition to this limitation, another problem with the first preferred embodiment is that there is a conflict between the natural center of rotation that is situated midway between the two rollers that bare on yoke plate 50 and the artificial (or forced) center occasioned by the force application from the stack tape loading device. Also, the shear force that is created by flexure plate 68 creates a further complication in that its resistance on yoke 50 adds additional constraints on T-lever 51's freedom to rotate. The total effect of these limitations on the first preferred embodiment is that in normal operation, there is a limited force that can be generated at the tip of the T-lever.

Figure 18:
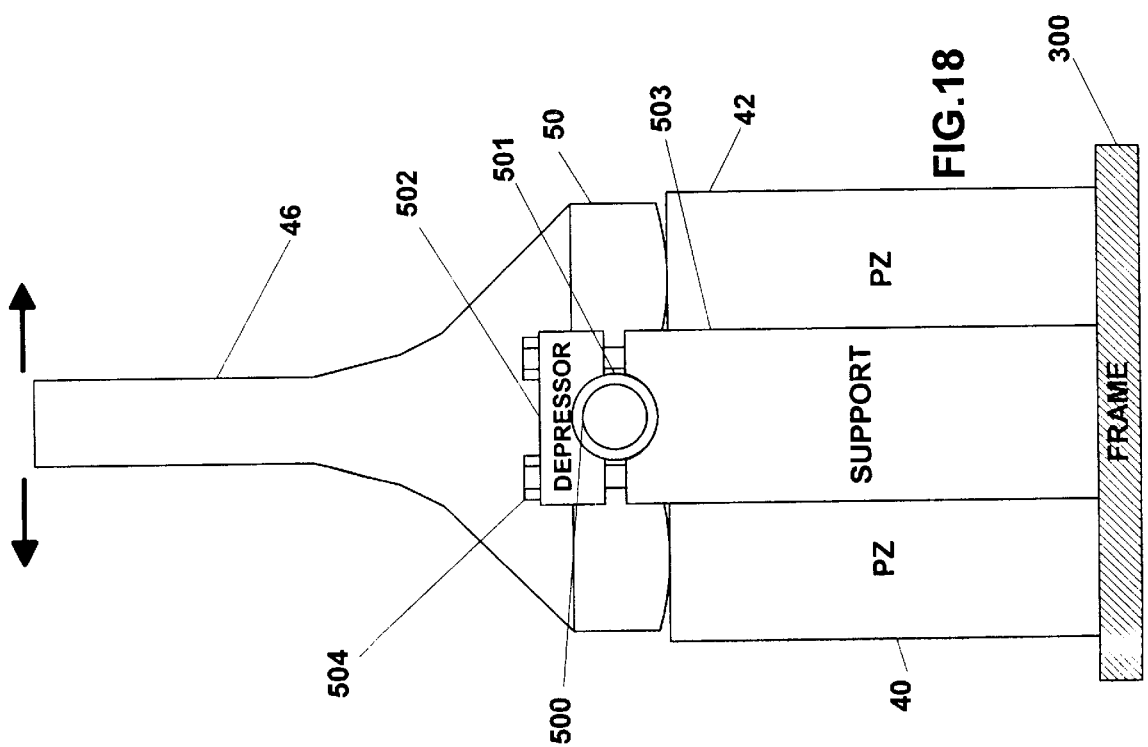
FIG. 18 shows a side view of an alternate compression element with the T-lever arm.

An alternate method of preload that can provide a more substantial force is seen by reference to FIG. 18. Here, a force is created that is equal to or exceeds the PZ stack's capability by adopting a pair of journal bearings 501 acting on a trunion shaft 500 which is added to the yoke 50. FIG. 18 shows the arrangement wherein yoke 50 is rounded on its lower side to form two stub shafts with their axes normal to the axes of the PZ stacks. Depressor 502 is adjusted by bolts 504 to preload the PZ stacks to any desired compressive stress that is within the compressive yield stress. This approach requires that lever arm 46 of T-lever 51 is reversed to provide its output motion located above the bearings, as shown in FIG. 18. This arrangement provides the maximum force effect and the maximum work that can be generated by the PZ stacks and should extend its application to a much wider range of devices. It will also improve its rate of response and increase operating bandwidth.

Figure 19:
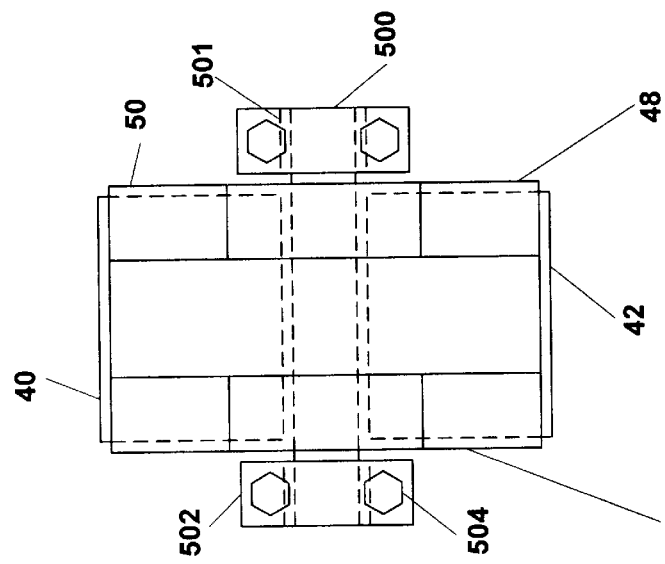
FIG. 19 shows a top view of an alternate compression element without the T-lever arm.

In summary, as shown in FIGS. 18 and 19, yoke plate 50 has shaft 500 rigidly embedded through its center so that yoke plate 50 forms a tight fit with shaft 500. The axis of shaft 500 is normal to the axes of the PZ stacks. Journal bearings 501 are positioned inbetween depressor 502 and supports 503 which supports are rigidly attached to frame 300. This provision avoids the bodily displacement of T-lever arm 46 that would occur in the absence of lateral support. The compressive force is increased or decreased by tightening or loosening bolts 504. The slots in supports 503 are deep enough so that the stacks take up the compressive forces. Shaft 500 tightly fits into journal bearings 501. As bolts 504 are tightened, force is exerted downward against journal bearings 501, and this force is transferred respectively to shaft 500 and yoke plate 50. Therefore, stacks 40 and 42 are compressed between yoke plate 50 and frame 300. Hence it should be clear to one of ordinary skill in the art that as stacks 40 and 42 are alternately electrically excited, T-lever arm 46 will rock back and forth around a pivot axis formed by rigid shaft 500.

While the first preferred embodiment of the present invention as shown and described herein is of the variety in which both piezoelectric stacks are active, i.e., are electrically excited, it is to be understood that in other embodiments of the present invention, responding to certain specialized requirements, only one of the piezoelectric stacks may be active, the other being passive, i.e., not electrically excited. It is also to be understood that within the scope of the present invention certain embodiments thereof may embody but one piezoelectric s tack, the other piezoelectric stack being rep laced by, e.g., an integral body of alumina the height of which is equal to the unexcited height of the active stack. In the testing circuit of FIG. 10 modulator 212 can be a sine wave generator of well known type or, in some test situations, a shaft position encoder of well-known type. Also in the testing circuit of FIG. 10, driver 210 may be a controllable output power supply, e.g., a KEPCO 100BOP bipolar programmable power supply. In certain embodiments of the testing circuit of FIG. 10 modulator 212 may be a commercially available power supply the output voltage level of which is responsive to manipulation of a manual control such as a knob, embodied therein. In this case, manual control 214 will be the output control section of modulator 212 and its manually operable knob or the like. Linear variable differential transformers suitable for use as LVDT 312 shown in FIG. 16 are well known and commercially available. As is well known to those having ordinary skill in the art, the primary winding of such a linear variable differential transformer must be excited from a suitable AC voltage source. In the actual device embodying the first preferred embodiment of the present invention the frequency of the exciting voltage applied to the primary winding of the linear variable differential transformer incorporated into tool beam carrier assembly 150 (FIG. 7) was 20 kHz, which can be obtained from an ordinary, commercially available AC power supply. It is to be understood that the piezoelectric elements 250 of the piezoelectric stacks of the present invention are first assembled into a complete stack in their non-polarized state, and, after the assembly of the stack, polarizing voltages are applied to the piezoelectric elements 250 via busses 276 and 278. In the first preferred embodiment of the present invention T-lever arms 46 and 48, cross brace 52 and tool beam 140 are fabricated from low-weight, high-strength material such as titanium or beryllium. In the tool tractor 10 of the first preferred embodiment of the present invention a tool motion of 0.5 mm and a force of six pound can be achieved in a tractor having a full stroke response of better than 100 Hz. As seen in FIGS. 1 and 2, a pair of receptacles is secured in apertures passing through roof plate 20. From these receptacles internal connections are made within tool positioner 10 by means of which exciting voltages may be applied to the busses of the piezoelectric stacks 40, 42, and by means of which exciting voltage may be conveyed to the linear variable differential transformer incorporated in tool beam carrier assembly 150, and by means of which the output signals from that linear variable differential transformer my be derived. Tool beam 140 is caused by H-plates 164, 166 (FIG. 7) to move in a linear path, thus ensuring that the entire tool beam 140 passes linearly forward and backward without change in pitch angle. By this means it is ensured that the tool secured in tool clamp 154 (FIG. 7) is advanced into the workpiece at a constant angle, and will remain in the same attitude through a cutting operation. It is also to be noted that this output device is friction-free, and that thus its control resolution is almost infinite. The output motion of tool positioner 10 can be controlled to provide displacement increments of as little as one micro-inch. Tool positioner 10 can be programmed to follow a sine wave at up to 100 Hz (up to 200 Hz with limited displacement). The pre-load on stacks A and B can be readily adjusted by means of vertical adjusting screw 104 (FIG. 3B). The forces acting horizontally on the T-lever arm assembly 46, 48, 50, 52, are reacted on a flexure member 68 attached to yoke plate 50 and also attached to anchor plate 32. This provision avoids the bodily displacement of the T-lever arm assembly due to the absence of lateral support. A feedback position sensor (LVDT) is built into tool beam position carrier assembly 150 to provide position monitoring of tool beam 140. As seen in FIG. 16, the position monitoring signal provided by this LVDT is compared with the command signal generated within tool displacement programmer 308 and a chuck angle signal set (buss 306) to produce an error difference signal which will be employed to make corrections of appropriate polarity to the stack driving voltages. While the LVDT used in the first preferred embodiment of the present invention is custom made by a supplier to Kinetic Ceramics, Inc., a commercially available substitute is made by Lucas-Schaevitz, by which source it is designated as Part No. E100. There are several other manufacturers of suitable units. The material of tape loop 78 is preferably stainless steel shimstock 0.375 inches wide. Lower tape anchor pin 118 is a simple steel dowel pin around which tape 78 passes, as seen in FIG. 9. The upper ends of tape loop 36 are brought together in preloading clamp 86. Both ends of tape 78 are fed into the clamp slot in pre-loading clamp 86, whereafter bolt 96 is passed through holes in the ends of tape loop 78 (FIG. 6). The sine wave generator or modulator 212 (FIG. 10) employed in the testing of tool positioner 10 of the first preferred embodiment of the present invention is an Interstate high-voltage function generator, type F43. Shaft position encoder 304 (FIG. 16) in the first preferred embodiment of the present invention may be an optical shaft position encoder such as an Oak-Grigsby 1000 NIBC.

The piezoelectric tool positioner of the present invention can be applied to a great many uses other than the one specifically shown. Persons skilled in this art will recognize that the positioners could be used to shape non-axisymmetric cylindrical mirrors and lenses. In this case the work piece in FIG. 17 would be rotated vertically. The tool positioner can also be used to position the seat of a precision low flow gas or fluid valve. Such valves would be extremely valuable in many medical and industrial applications.

It will thus be seen that the objects set forth above, among those made apparent from the preceding description, are efficiently attained, and since certain changes may be made in the above constructions and the method carried out thereby without departing from the scope of the present invention it is intended that all matter contained in the above description or shown in the accompanying drawings shall be interpreted as illustrative only, and not in a limiting sense. It is also to be understood that the following claims are intended to cover all of the generic and specific features of the invention herein described, and all statements of the scope of the invention which, as a matter of language, might be said to fall therebetween.

I claim:
1. A piezoelectric positioner, comprising:
    A) a frame;
    B) a first piezoelectric stack mounted on said frame;
    C) a second piezoelectric stack mounted on said frame;
    D) a T-lever defining a yoke having a first side and a second side and a T-lever arm;
    E) a compression element positioned to hold in compression:
        1) said first stack between said first side of said yoke and said frame, and
        2) said second stack between said second side of said yoke and said frame;
    F) a programmable voltage source programmed to provide elongating voltages alternatingly to said first and said second stacks to cause said stacks to alternatingly expand against compressive forces produced by said compression element so as to cause said yoke to rock back and forth and to cause said T-lever arm to swing back and forth;
    G) a tool beam flexibly connected to said T-lever arm;
    H) a tool beam restraint for restraining movement of said tool beam to back and forth motion in a single direction.

2. A piezoelectric tool positioner as in claim 1 and further comprising a tool mounted on said tool beam.

3. A piezoelectric positioner as in claim 1, wherein said compression element comprises a depressor mounted on said yoke and steel tape held in tension between said depressor and said frame.

4. A piezoelectric positioner as in claim 1, and further comprising a shaft attached to said yoke and said compression element comprises two supports, two depressors and two bearings mounted on said shaft and a plurality of threaded tightening elements connecting said depressors to said supports; wherein said first and second stacks are compressed between said yoke and said frame when said tightening elements are tightened.

5. A piezoelectric positioner as in claim 4 wherein said tightening elements are bolts.

6. A piezoelectric positioner as in claim 1 wherein said tool beam restraint comprises at least two H plates.

7. A piezoelectric positioner as in claim 1 wherein said programmable voltage source is programmed to position said tool based on electronic signals representing X, Y, Z and radial positions of a workpiece.

8. A piezoelectric positioner as in claim 7 and further comprising a detector to detect positions of said tool.

9. A piezoelectric positioner as in claim 8 wherein said detector is a linear variable differential transformer.

10. A piezoelectric positioner, comprising:

A) a frame;

B) a first piezoelectric stack mounted on said frame;

C) a second piezoelectric stack mounted on said frame;

D) a T-lever defining a yoke having a first side and a second side and a T-lever arm;

E) a compression means for holding in compression:
   1) said first stack between said first side of said yoke and said frame, and
   2) said second stack between said second side of said yoke and said frame;

F) a programmable voltage means programmed to provide elongating voltages alternatingly to said first and said second stacks to cause said stacks to alternatingly expand against compressive forces produced by said compression element so as to cause said yoke to rock back and forth and to cause said T-lever arm to swing back and forth;

G) a tool beam flexibly connected to said T-lever arm;

H) a tool beam restraint means for restraining movement of said tool beam to back and forth motion in a single direction.

11. A piezoelectric positioner as in claim 10, wherein said compression means comprises a depressor mounted on said yoke and steel tape held in tension between said depressor and said frame.

12. A piezoelectric positioner as in claim 10, and further comprising a shaft attached to said yoke and said compression means comprises two supports, two depressors and two bearings mounted on said shaft and a plurality of threaded tightening means connecting said depressors to said supports; wherein said first and second stacks are compressed between said yoke and said frame when said tightening means are tightened.

13. A piezoelectric positioner as in claim 12 wherein said tightening means are bolts.

14. A piezoelectric positioner as in claim 10 wherein said tool beam restraint means comprises at least two H plates.

15. A piezoelectric positioner as in claim 10 wherein said programmable voltage means is programmed to position said tool based on electronic signals representing X, Y, Z and radial positions of a workpiece.

16. A piezoelectric positioner as in claim 15 and further comprising a detector to detect positions of said tool.

17. A piezoelectric positioner as in claim 16 wherein said detector is a linear variable differential transformer.

18. A piezoelectric positioner as in claim 10 wherein a diamond tool is mounted on said tool beam.

19. A piezoelectric tool positioner as in claim 10 wherein a valve stem of a flow regulating valve is mounted on said tool beam and said positioner is programmed to control said valve.

20. A piezoelectric tool positioner as in claim 10 wherein said movement is generated from a command of an electrical signal that represents said movement required, wherein said movement is to perform an operational function.

21. A piezoelectric tool positioner as in claim 10 wherein said programmable voltage means comprises:

A) a common source voltage input, and

B) a unity gain inverting amplifier comprising a drive output for said first piezoelectric stack and a drive output for said second piezoelectric stack, wherein said unity gain inverting amplifier is electrically connected in-between said common source voltage input and said first and said second piezoelectric stacks, wherein said drive output for said first piezoelectric stack is the inverse of said drive output for said second piezoelectric stack.

\* \* \* \* \*